United States Patent [19]

Hose

[11] 4,361,828
[45] Nov. 30, 1982

[54] AUTOMOTIVE COMMUNICATION

[76] Inventor: Wanda H. Hose, 24 Shadyrest Rd., South Yarmouth, Mass. 02664

[21] Appl. No.: 170,099

[22] Filed: Jul. 18, 1980

[51] Int. Cl.³ .................... B60Q 1/00; G08C 9/08; G09F 9/00
[52] U.S. Cl. .................... 340/107; 340/87; 340/124; 340/365 R; 340/790; 340/798; 340/808; 40/489
[58] Field of Search ............ 340/107, 84, 87, 122–124, 340/144–146, 365 R, 366 R, 705, 790, 798, 806, 807, 808; 40/489, 490, 508, 510

[56] References Cited

U.S. PATENT DOCUMENTS

| | | | |
|---|---|---|---|
| 2,878,462 | 3/1959 | Tralli | 340/107 |
| 2,964,743 | 12/1960 | Bange | 340/365 |
| 3,129,294 | 4/1964 | Henatsch | 340/365 R |
| 3,226,707 | 12/1965 | Newmer et al. | 340/107 |
| 3,432,808 | 3/1969 | Fleece | 340/84 |
| 3,518,624 | 6/1970 | Smith | 340/84 |
| 3,561,008 | 2/1971 | Nazare | 340/379 |
| 3,678,457 | 7/1972 | Lev | 340/107 |
| 3,683,330 | 8/1972 | Lancaster | 340/107 |
| 3,750,138 | 7/1973 | Burgan et al. | 340/87 |
| 4,109,245 | 8/1978 | Hedin | 340/808 |
| 4,218,603 | 8/1980 | Satoh | 340/365 R |

Primary Examiner—John W. Caldwell, Sr.
Assistant Examiner—Donnie L. Crosland
Attorney, Agent, or Firm—Blodgett & Blodgett

[57] ABSTRACT

A vehicle communication system device consisting of an opto-electrical message display unit adapted to be viewed from the exterior of the vehicle and of a message control unit that is connected to the display unit for programming a message and transmitting an electrical pulse pattern to the display unit that causes the display unit to display the programmed message.

10 Claims, 9 Drawing Figures

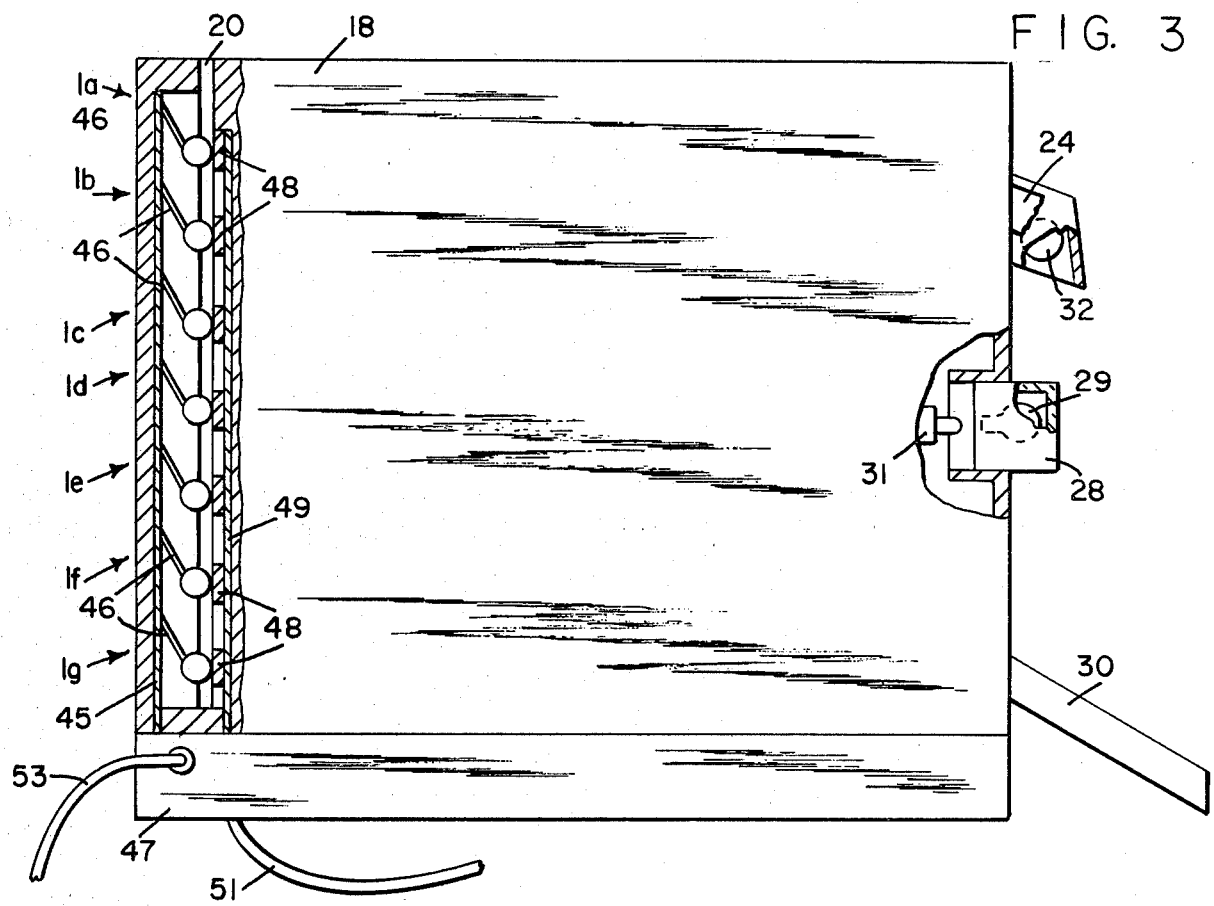
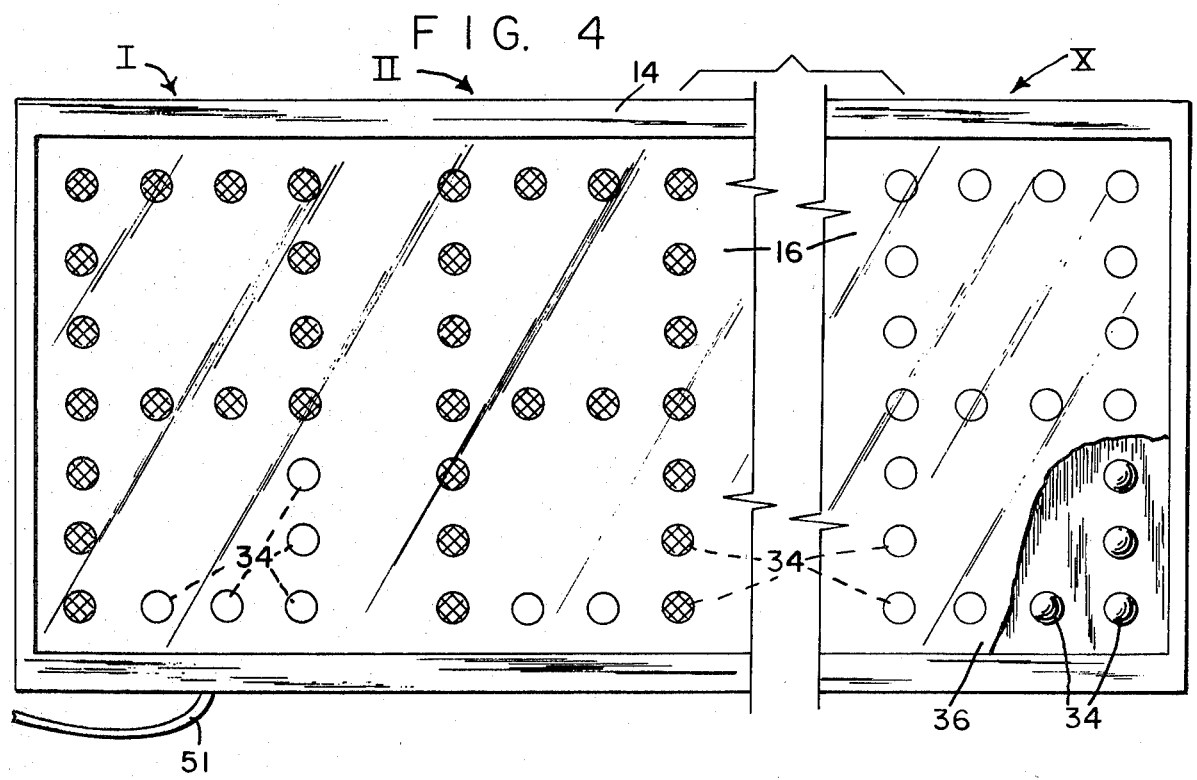

AUTOMOTIVE COMMUNICATION

BACKGROUND OF THE INVENTION

This invention relates generally to vehicle communication and, more specifically, to visual vehicle communication. Vehicle communication devices are well-known in the art and include simple means such as turn signals and brake lights. Other simple communicating devices include fixed signs with appropriate messages. Still other communication devices have combined the features of an electrical turn signal with that of a fixed sign by providing a sign that can be selectively illuminated from control means inside of the vehicle. An example of such a device is shown in U.S. Pat. No. 2,878,462 to Tralli. All of these devices are severely limited in the amount of information that can be communicated to the driver of another vehicle. This problem has been solved somewhat by a number of devices that comprise a plurality of signs each with a separate message that can be selectively illuminated by controls located inside of the vehicle. An example of one of these devices is shown in U.S. Pat. No. 3,678,457 to Lev.

The above-described patent to Lev shows a message display unit having a plurality of predetermined messages adapted to be mounted at the rear of a vehicle. The display unit has a plurality of compartments separated from one another. Each compartment contains a message that appears on an opaque-transparent piece of sheet material with a light behind it. The display unit is controlled by a control unit which is mounted inside of the vehicle adjacent the driver's seat. The control unit includes a plurality of switches, each of which controls a light source in the display unit. The driver can select which of the messages he wishes to be illustrated by actuating the appropriate switch in the control unit.

Although devices such as that shown in the Lev patent do provide a wider range of communication possibilities, all of the devices are limited by the number of messages that can be mounted on the display unit. These and other difficulties experienced with the prior art devices have been obviated by the present invention.

It is, therefore, an outstanding object of the invention to provide a vehicle communication device with greatly expanded communication possibilities.

Another object of this invention is the provision of a vehicle communication device having a control unit in which messages can be programmed and a display unit for displaying any programmed message.

A further object of the present invention is the provision of a vehicle communication device having a display unit provided with a viewing screen effective to display messages that are determined by electrical pulse patterns and a programmable control unit for transmitting message pulse patterns to the display unit.

It is another object of the instant invention to provide a vehicle communication device having a display unit provided with a plurality of light-emitting elements arranged in a matrix, the elements being selectively energizable by electrical pulse patterns to form a plurality of messages.

A still further object of the invention is the provision of a vehicle communication device having a control unit that can receive and read an element containing a pre-programmed message and produce a pulse pattern that corresponds to the message.

It is a further object of the invention to provide a vehicle communication device having means for storing a plurality of programmed messages and means for selecting any one of the stored messages for display.

It is a further object of the invention to provide a vehicle communication device that has greatly expanded message capacity and is easy to operate.

It is a further object of the invention to provide a vehicle communication device that has greatly increased message capabilities and has a simplified construction that enables it to be easily manufactured and maintained.

With these and other objects in view, as will be apparent to those skilled in the art, the invention resides in the combination of parts set forth in the specification and covered by the claims appended hereto.

SUMMARY OF THE INVENTION

In general, the invention consists of a visual communication device having an optical message display unit adapted for being viewed from the outside of a vehicle. The unit is effective to receive an electrical pulse pattern and to display a message that corresponds to the received electrical pulse pattern. An electrical message control unit has means for introducing a program for a selected message and for transmitting an electrical pulse pattern to the display unit that corresponds to the selected message.

More specifically, the invention comprises a display unit having a plurality of light-emitting elements arranged in a matrix in which the elements are selectively energizable to emit light and form a selected message upon receiving a corresponding pulse pattern. The control unit has the capacity to receive a card that contains a pre-programmed message, to read the pre-programmed message, and to transmit a pulse pattern to the display unit that corresponds to the message. The control unit also has means for storing a plurality of message programs and for selecting any one of the stored message programs for transmittal to the display unit.

BRIEF DESCRIPTION OF THE DRAWINGS

The character of the invention, however, may be best understood by reference to one of its structural forms, as illustrated by the accompanying drawings, in which:

FIG. 3 is a side elevational view of the control unit with portions broken away, FIG. 4 is a fragmentary front elevational view of the display unit of the vehicle communication device.

DETAILED DESCRIPTION OF THE INVENTION

Figure 1:
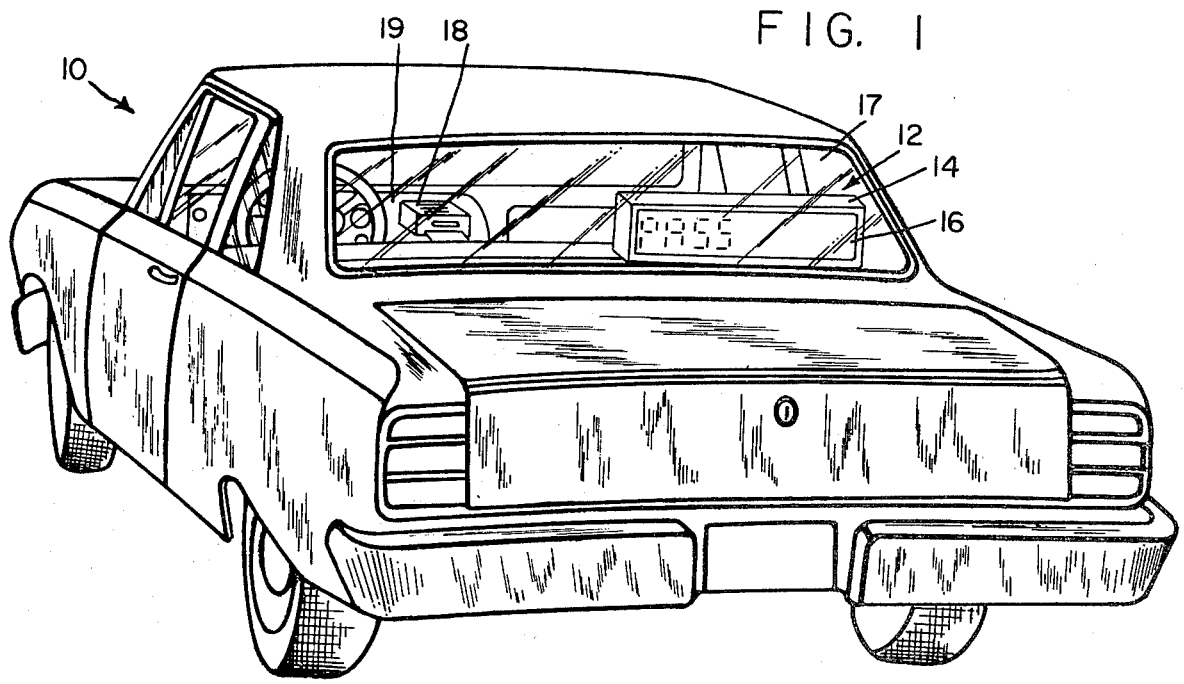
FIG. 1 is a perspective view of an automobile equipped with a vehicle communication device embodying the principles of the present invention.
Figure 2:
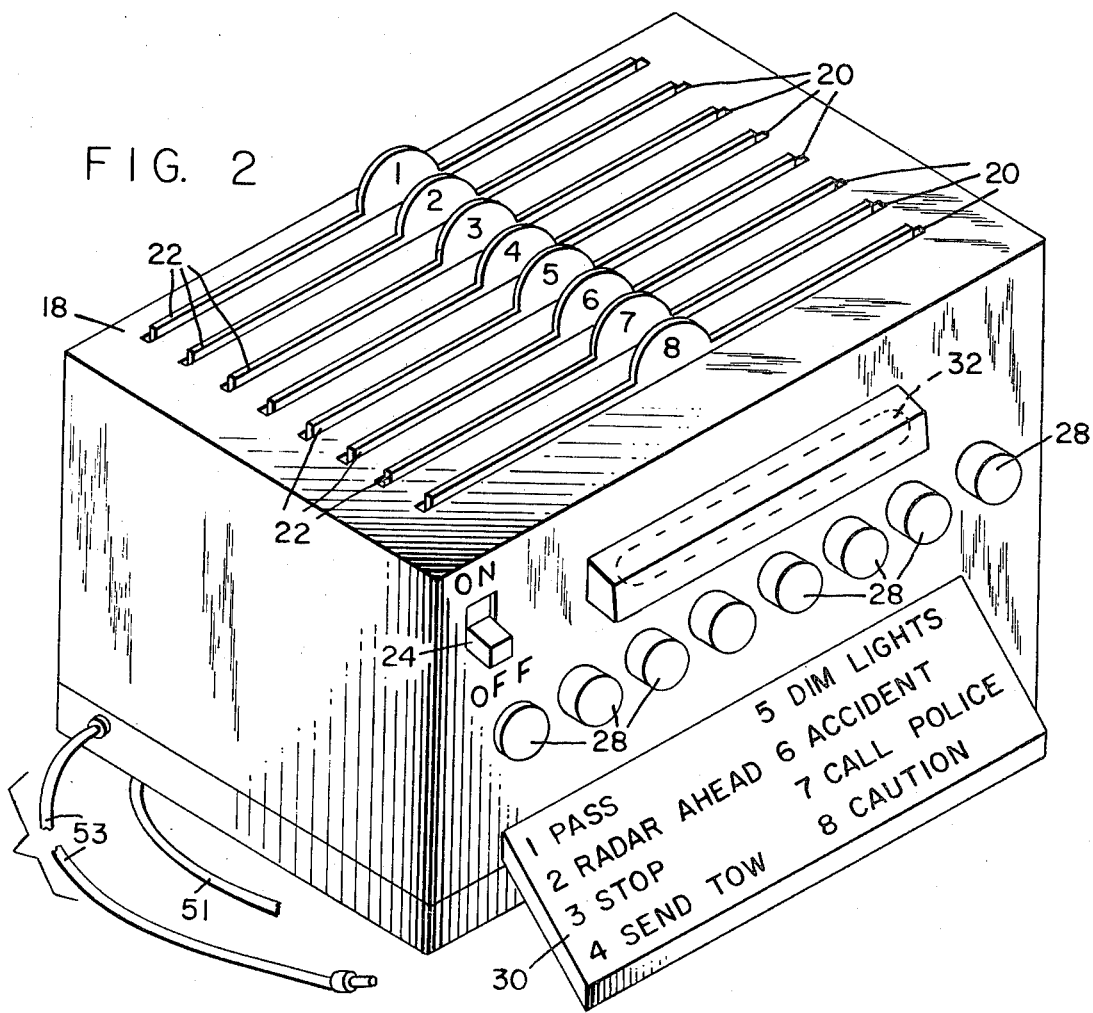
FIG. 2 is a perspective view of the control unit of the vehicle communication device.

Referring first to FIGS. 1 and 2, which best show the general features of the invention, the visual communication device of the present invention, generally indicated by the reference numeral 12, is shown applied to an automobile 10. The communication device 12 is provided with an opto-electrical display unit 14 that has a viewing screen 16. The display unit 14 is positioned adjacent the rear window 17 of the automobile, so that the screen 16 can be viewed from outside of the automobile. The communication device 12 also includes an electrical message control unit 18 which is normally placed on the dashboard 19 of the automobile where it can be easily reached by the driver.

Figure 5:
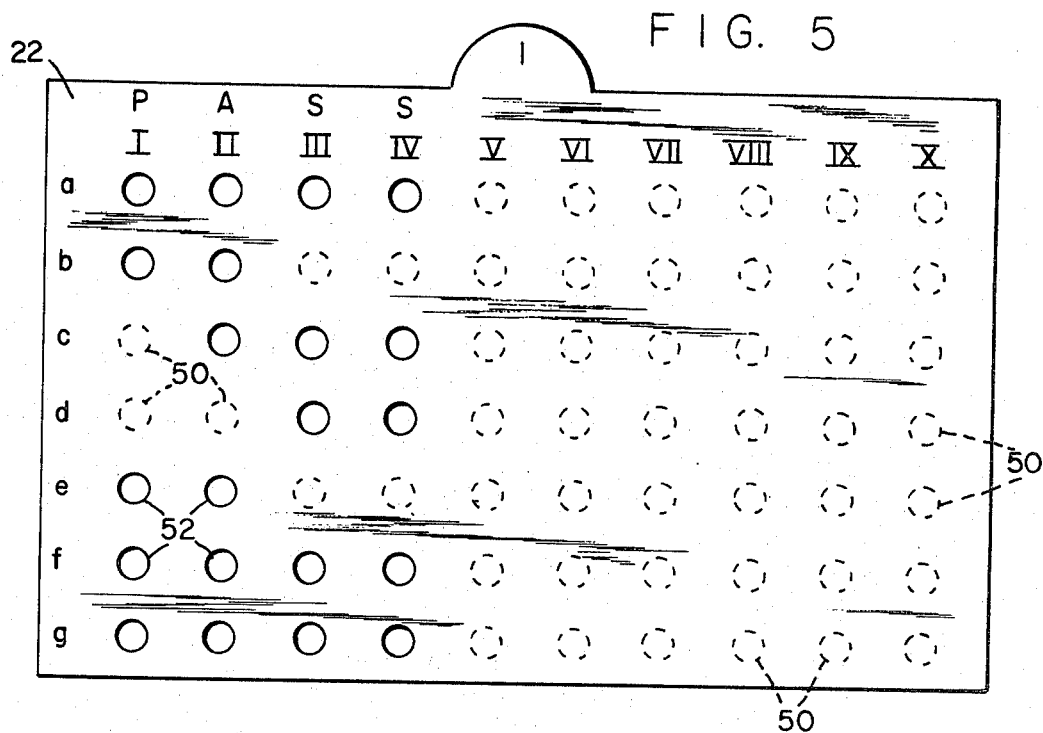
FIG. 5 is a front elevational view of a message program card for insertion into the control unit.

Referring particularly to FIGS. 2 and 3, the control unit 18 has a plurality of vertical message slots 20 that can open at the top of the unit for receiving a plurality of message cards 22. One of the message cards 22 is shown in FIG. 5 and is described hereinafter in greater detail. Unit 18 also includes an on-off switch 24, and a plurality of message selecting buttons 28. Buttons 28 are of the type commonly used on electrical control units such as a telephone receiver equipped with intercom that includes a plurality of buttons. As in the case of a telephone intercom, only one button 28 can depress at a time and the selected button is locked in the depressed position until a new button is selected. Selection of a new button automatically releases the previously depressed button and the newly selected button is locked into the depressed position. Each button 28 is made of a translucent material such as clear plastic and contains a light bulb 29 that is illuminated when the button is depressed and closes a selector switch 31. Buttons 28 are numbered 1-8 and correlate with slots 20 containing message cards 22 numbered 1-8, respectively, in a manner to be described. A reader panel 30 is located below buttons 28 on which are written messages 1-8 that correlate with buttons 1-8, respectively. A reading light 32 is located above buttons 28 and reader panel 30 for illuminating the buttons and panel. Light 32 is turned on when the "on" button 24 is depressed.

The display unit 14 is shown in FIG. 4. Viewing screen 16 comprises a plurality of light-emitting elements 34 arranged in a matrix behind a translucent panel 36. The light-emitting elements 34 are low-voltage, incandescent lamps of the type generally used in automobiles. Incandescent lamps are preferred, since they provide sufficient illumination under all conditions. However, under certain circumstances, light-emitting elements such as light-emitting diodes may also be used. The matrix of light-emitting elements 34 is subdivided into discreet matrix units identified by I, II and IX in FIG. 4. The elements 34 in each matrix unit can be selectively illuminated to display a plurality of symbols such as the letters of the alphabet or Arabic numerals. Each matrix unit shown in FIG. 4 is a simplified seven bar matrix for roughly illustrating letters or numbers. As for example, the letter "P" shown in matrix unit I and the letter "A" shown in matrix unit II are formed when cross-hatched elements 34 are illuminated. A more complex matrix unit may be employed, if desired to illustrate letters and numbers in greater detail. However, the present simplified seven bar matrix has been widely used and accepted.

Figure 7:
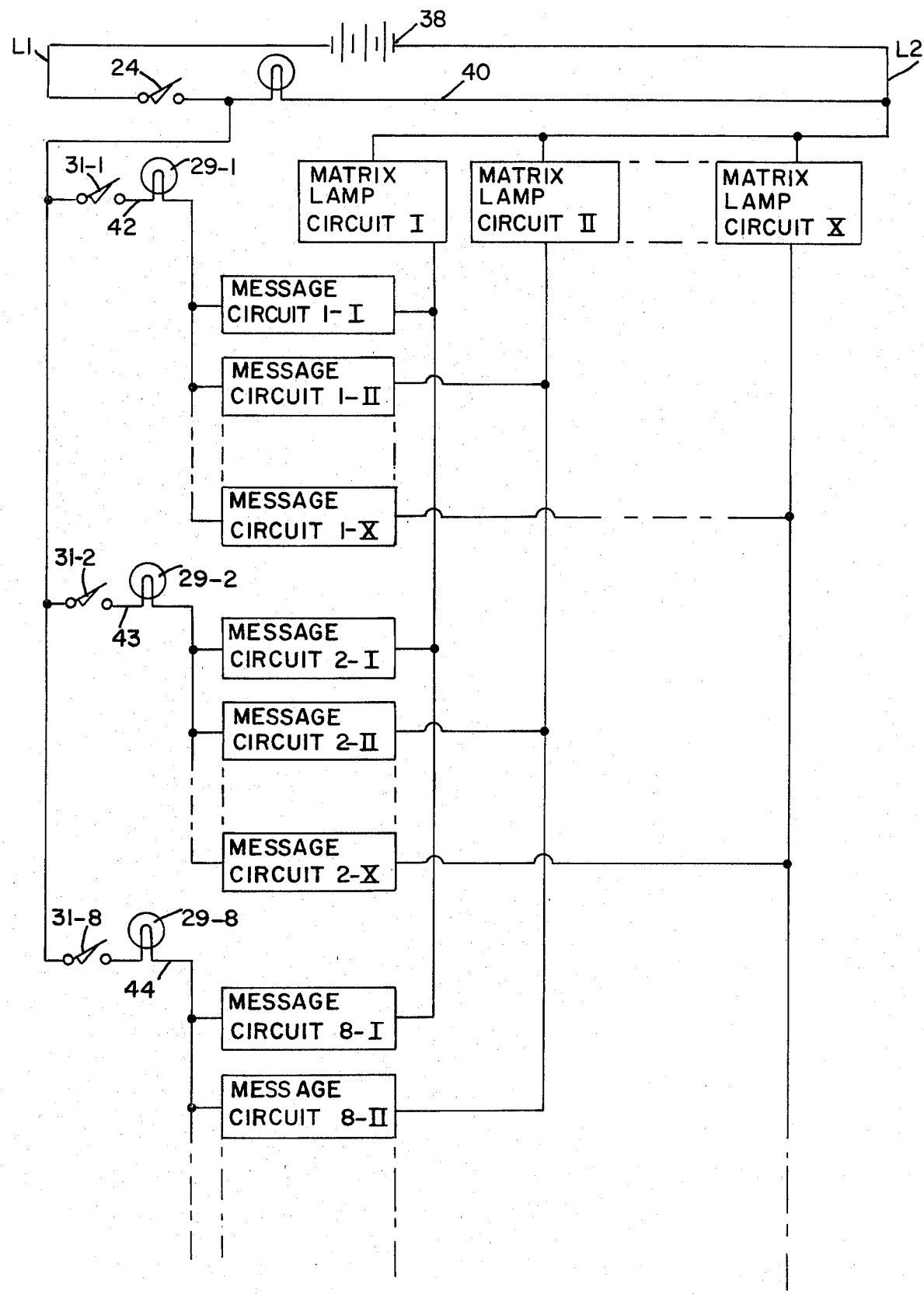
FIG. 7 is an electrical diagram showing the general circuitry of the vehicle communication device.
Figure 8:
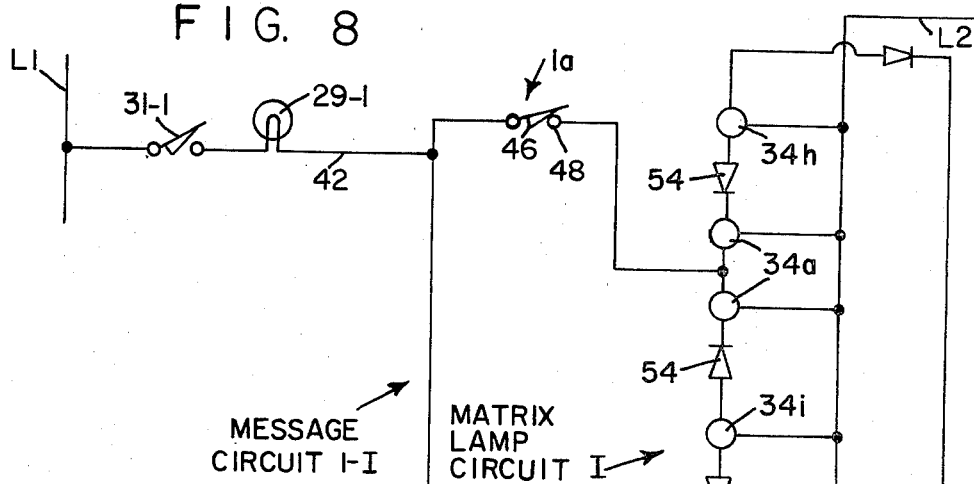
FIG. 8 is a fragmentary electrical diagram of the circuitry for a matrix unit of light-emitting elements for forming a single message symbol.
Figure 9:
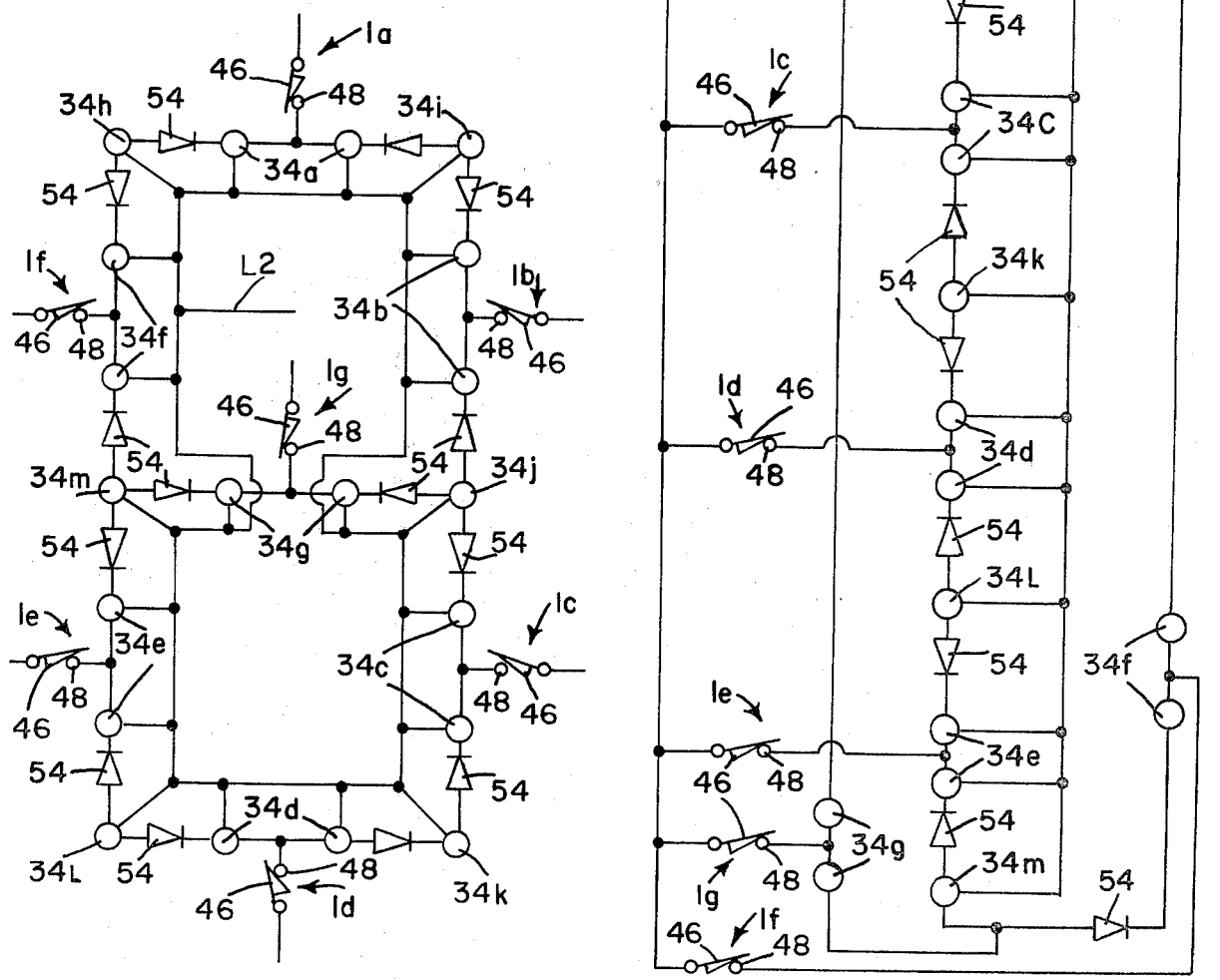
FIG. 9 is a diagrammatic view showing the circuit of FIG. 8 in which the light-emitting elements are arranged in a matrix for forming a single message symbol.

FIGS. 7-9 show the control circuitry for the auto communication device 12 of the present invention, the overall circuitry being shown in FIG. 7. The control circuitry comprises a pair of power lines L-1 and L-2 connected to a source of low-voltage electrical power 38 such as a battery or accessory circuit of an automobile. Reading light 32 is located in a line 40 which also contains "on-off" switch 24. When it is desired to use the communication device, switch 24 is flipped to the "on" position which closes the switch and connects line 40 across power line L-1 and L-2, thereby causing reading light 32 to be illuminated. Closing of switch 24 also connects all of the switches 31 associated with message selecting buttons 28 to power line L-1.

Each selector switch 31 controls a plurality of message circuits connected in parallel, one for each matrix unit. The selector switch for the first message is identified in FIG. 7 as 31-1 and is located on line 42. The selector switch for the second message is identified as 31-2 on line 43 and the selector switch for the eighth message is 31-8 on line 44. The circuitry for the third through seventh messages are omitted from the diagram for simplicity, since all of the message circuits are identical. The light bulbs 29 are located within the buttons 28 are identified by the reference numerals 29-1, 29-2 and 29-8 on lines 42, 43 and 44, respectively. When any one of the selector switches is closed, the light bulb located on the same line is illuminated within the corresponding button 28.

The message circuits associated with switch 31-1 are identified in FIG. 7 as 1-I, 1-II and 1-X. The message circuits 1-III through 1-IX are eliminated from the diagram for simplicity. The message circuits 1-I through 1-X are connected to matrix lamp circuits I through X, respectively, only circuits I, II and X being shown for simplicity. The message circuits associated with each of the remaining selector switches are also connected to the matrix lamp circuits in the same manner. As shown for example in FIG. 7, message circuits 2-I, 2-II and 2-X are connected to matrix line circuits I, II and X, respectively. Also, message circuits 8-I and 8-II are connected to matrix line circuits I and II, respectively.

Referring to FIG. 8, message circuit 1-I and matrix lamp circuit I are shown in detail. Message circuit 1-I comprises a plurality of switches 1a, 1b, 1c, 1d, 1e, 1f and 1g connected in parallel to line 42. As shown in FIG. 3, switches 1a through 1g are located in control unit 17. Each switch comprises a spring-loaded switch arm 46 that extends into the rearmost slot 20 for the message No. 1 and engages a contact 48 on the opposite side of the slot. Switch arms 46 are connected to a conductor strip that is connected to line 42 in the control box 47 at the bottom of unit 18. Contacts 48 are connected to a circuit panel 49 that connects each of the individual contacts 48 to the lamp circuit I as shown in FIG. 8 in the control box 47. A cable 51 connects the control unit 18 to the display unit 14. A cable 53 connects the control unit 18 to a source of electrical power. Each of the remaining message circuits connected to selector switch No. 1 each comprise the same number of switches as circuit 1-I and are located in ten separate columns across the width of slot 20 for position No. 1. Likewise, each message circuit 2-I and 2-X associated with selector switch 31-2 are located in ten spaced columns across the width of slot 20 for the second message position. The remaining message circuits associated with the remaining selector switches 31-3 through 31-8 comprise ten columns of switches such as that shown in FIG. 3 for the remaining slots 20 for the message positions 3-8.

When a message card 22 such as that shown in FIGS. 2 and 5 is inserted into slot 20, all of the switch arms associated with that slot are moved away from their respective contacts 48, thereby opening the switches. However, as shown in FIG. 5, each message card 22 is provided with perforations defining circular areas 50 that can be punched out to form holes 52. There are ten columns of such perforations identified I through X, one for each matrix unit and there are seven perforations in each column identified a through g, one for each bar in a matrix unit. When the card 22 is inserted into slot 20, the perforated areas for columns I through X are aligned with the columns of switches 1a through 1g of the ten message circuits associated with that particular message slot. Wherever a perforated area 50 remains intact, the particular switch that is aligned therewith will be opened when the card is inserted. However, if the perforated area is punched out to produce a hole 52, the particular switch aligned with the hole will remain in engagement with its respective contact 48 when the card is inserted.

Referring particularly to FIG. 8, matrix lamp circuit I comprises a plurality of lamps 34 connected to power line L-2. Lamps 34 are divided into primary lamps 34a through 34g and secondary lamps 34h through 34m. Primary lamps 34a through 34g are connected to switches 1a through 1g, respectively. The primary lamps are arranged in pairs, while the secondary lamps are connected as single lamps. Each secondary lamp is connected to two or more pairs of primary lamps, each connection being through a diode that allows the secondary lamp to be energized when the primary lamp to which the diode is connected is energized. In this way, each secondary lamp will be illuminated when any of the primary lamp pairs to which it is connected are illuminated. This provides added illustrative flexibility to the matrix unit with a minimum of electrical connections. This principle is illustrated in FIG. 9 which shows the lamps of FIG. 8 arranged into a matrix unit.

As shown in FIG. 9, the lamps are arranged in a figure eight matrix of three horizontal and four vertical bars or sections. The primary lamps 34a, 34g and 34d form the center of the three horizontal sections and the remaining primary lamp pairs form the middle portions of the four vertical sections. The secondary lamps are located in the corners of the matrix and between the two vertical sections on each side of the matrix, as well as forming the end lamps of the middle horizontal section formed by primary lamps 34g. In this way, the secondary lamps serve a dual function by extending the length of each of the sections of which they form a part. For example, lamps 34h and 34i will be illuminated when lamps 34a are illuminated to form a complete upper matrix section of four lamps. Lamp 34h will also be illuminated together with lamp 34m when primary lamps 34d are illuminated, thereby forming a complete horizontal section at the left side of the matrix. Since lamp 34m is also connected to primary lamps 34d and 34e, it will be illuminated when either of these pairs of primary lamps are illuminated.

Figure 6:
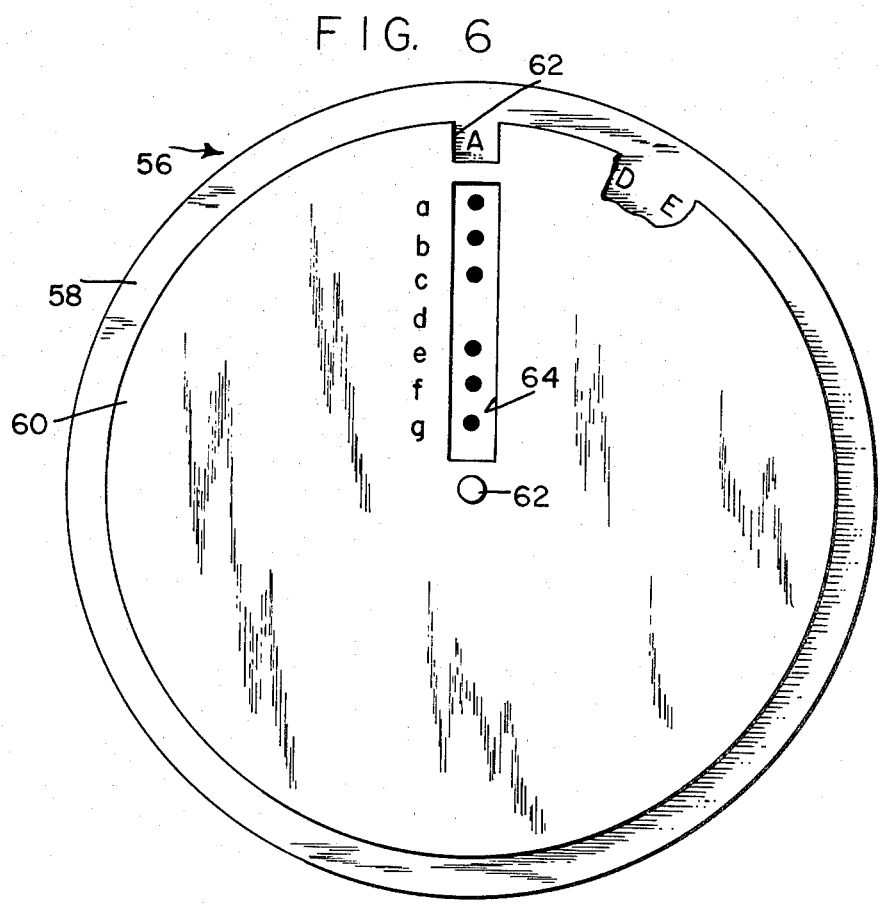
FIG. 6 is a plan view of a message coder for use with the program card shown in FIG. 5.

The operation and the advantages of the present invention will now be readily understood in view of the above description. Prior to the use of the invention, a plurality of message cards are prepared by punching out selected perforated areas 50 to produce holes 52 that, when inserted into the appropriate slot 20, it will provide a desired message. As an aid in preparing each message card, the chart may be prepared showing which of the seven perforated areas a through g in each column that must be punched out to form each desired symbol such as the letters of the alphabet. It is preferred however, to use a message coding template such as that shown in FIG. 6 and generally indicated by the reference numeral 56. Template 56 comprises a base disc 58 and a reading disc 60 rotatably mounted on disc 58 by means of a pin 62. Base disc 58 contains all of the letters of the alphabet, as well as other symbols as Arabic numerals arranged in a circle that are normally covered by the outer peripheral portion of reading disc 60. Readings disc 60 is provided with an outer notch 62 and a slot 64 aligned with a notch 62. Notch 62 extends below the line of symbols of the base disc and is wide enough to expose one symbol at a time. The base disc 58 also contains a message code comprising a series of dots extending between each symbol and pin 62. When notch 62 exposes a symbol, slot 64 also exposes the message code for that symbol. The message may be coded in a variety of ways, but as shown in FIG. 6 the seven bars or sections a through g of the seven bar matrix unit are printed along slot 64. The code for each symbol takes the form of a series of dots. If a dot appears next to a letter, then the perforated section 50 adjacent that letter is punched out. For example, the letter A is a seven bar matrix is formed by illuminating all of the bars except the lower horizontal bar and therefore a dot appears next to each letter except d. The card shown in FIG. 5 has been prepared for the message PASS and therefore columns I, II, III and IV have been prepared to form this particular message.

After all of the message cards have been prepared in the above-described manner, the selected message is written on each card and the message is also written on the reader panel 30 to correlate the messages with the appropriate card. The cards 1 through 8 are then inserted into the appropriate slots 20 so that the cards 1 through 8 will correspond with the messages 1 through 8 on the message board 30. During use, the device is turned on by flipping switch 24 to the "on" position which also turns on light 32 to illuminate the reader board 30. The appropriate message to be shown on the display unit 14 is selected by pushing in the appropriate button 28 that corresponds to the number assigned to that message. For example, if the driver wishes a following vehicle to pass, the first button 28 is depressed, thereby closing switch 31-1 and activating the message circuits 1-I, 1-II, 1-III and 1-IV to illuminate the appropriate lamps in the first four matrix units as controlled by card No. 1 to show the message PASS in the viewing screen 16, as shown in FIG. 1.

It is to be understood, of course, that the invention is not limited to any particular number of messages or to any particular matrix configuration. For example, eight slots are shown in the control unit as a convenient way of storing a plurality of messages that can be easily selected. The kinds of messages that are stored will depend entirely on the discretion of the user and the user may decide from time-to-time to change some of the messages. Additional cards can also be prepared and can be inserted into any of the slots at any time. The invention also enables a single slot to be used for a plurality of message cards. For example, a large number of message cards could be prepared and indexed so that the desired message cards can be easily located and inserted into the message slot, whereupon that message will appear on the viewing screen 16 of the display unit. If the user wishes to display a second message, the first card will be removed and the appropriate card showing the second message will be inserted into the message slot.

A further example of how the present invention can be used is that cards can be placed in all of the slots but one and the one empty slot can be used for a larger number of additional cards. The most commonly used messages can be stored in the control unit where they can be conveniently selected while allowing additional messages to be inserted into the empty slot whenever it is desired to do so.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A visual communication device for vehicles comprising:
   (a) an opto-electrical display unit including a viewing screen adapted for being viewed from outside of the vehicle and a plurality of light-emitting elements forming part of a display circuit and arranged in a matrix on said viewing screen, said elements being selectively energizable to emit light, said unit being effective to receive an electrical pulse pattern and to display a message on the screen that corresponds to said received electrical pulse pattern,
   (b) an electrical message control unit having a message slot and a plurality of message switches to form a message circuit, each switch of the message circuit having a biased arm that extends into the message slot to maintain the switch in an actuated state, means being provided to produce an incremental movement of said arm against the bias of the bias arm which movement is effective to de-activate the switch,
   (c) means for selectively actuating said message switches comprising a message card of a thickness that provides said incremental movement of the switches upon insertion of the card into the slot, said card being provided with holes arranged in a message pattern for registering with selected ones of said biased switch arms to enable the switches associated with said selected switch arms to remain actuated and for transmitting an electrical pulse pattern to the display unit that corresponds to the message pattern on said card, and
   (d) a source of electrical power connected to said display and control units.

2. A visual communication device as recited in claim 1, wherein said light-emitting elements are incandescent lamps.

3. A visual communication device as recited in claim 1, wherein each switch comprises a contact on one side of the message slot and the biased arm is a contact arm extending from the opposite side of the slot and biased into electrical engagement with the contact, the message card being effective upon insertion into the slot to separate the contact arm from the contact and de-activate its associated switch except where a hole is provided with the contact.

4. A visual communication device as recited in claim 1, wherein the matrix of light-emitting elements is divided into a plurality of symbol units, each symbol unit comprising a plurality of light-emitting elements, the light-emitting elements of each symbol unit being selectively actuated by said pulse pattern to form any one of a plurality of symbols.

5. A visual communication device as recited in claim 1, wherein the light-emitting elements in each symbol unit are divided into primary and secondary elements, each primary element being energized upon receiving an electrical pulse from the control unit, each of said secondary elements being connected to two primary elements through electrical circuitry that enables the secondary element to be energized when either of the two primary elements is energized.

6. A visual communication device as recited in claim 1, wherein the message control unit comprises means for storing a plurality of selected message programs and means for selectively transmitting the pulse pattern of any one of said stored message programs to the display unit.

7. A visual communication device as recited in claim 6, wherein each message program is stored in a message circuit comprising a plurality of selectively actuated switches and the means for selectively transmitting the pulse pattern of any one of the stored message programs comprises a manually operated selector switch for each message unit.

8. A visual communication device as recited in claim 7, wherein a message indicator light is connected in series with each selector switch so that the light is illuminated upon closing of the switch.

9. A visual communication device as recited in claim 8, wherein each selector switch is actuated by a translucent hollow button and the light associated with the selector switch is located within the button.

10. A visual communication device as recited in claim 9, wherein the control unit comprises a message reader panel to provide a visual display of programmed messages and the correlation of the messages with appropriate buttons.

* * * * *